United States Patent
Russell, Sr.

(10) Patent No.: US 8,119,100 B2
(45) Date of Patent: *Feb. 21, 2012

(54) METHOD AND SYSTEM FOR HYDROGEN POWERED FUEL CELLS

(76) Inventor: Charles William Russell, Sr., Los Angeles, CA (US)

( * ) Notice: Subject to any disclaimer, the term of this patent is extended or adjusted under 35 U.S.C. 154(b) by 875 days.

This patent is subject to a terminal disclaimer.

(21) Appl. No.: 12/069,936

(22) Filed: Feb. 13, 2008

(65) Prior Publication Data

US 2009/0202872 A1    Aug. 13, 2009

(51) Int. Cl.
- *C01B 3/08* (2006.01)
- *C01B 6/24* (2006.01)
- *C01B 3/36* (2006.01)
- *C10J 3/46* (2006.01)
- *C10J 3/54* (2006.01)

(52) U.S. Cl. ........ 423/657; 423/644; 423/658; 48/197 R

(58) Field of Classification Search ................. 48/197 R; 423/657, 658

See application file for complete search history.

(56) References Cited

U.S. PATENT DOCUMENTS

| | | | |
|---|---|---|---|
| 6,348,278 B1 | 2/2002 | LaPierre | |
| 6,502,533 B1 | 1/2003 | Meacham | |
| 6,620,537 B2 | 9/2003 | Struthers | |
| 7,087,331 B2 | 8/2006 | Keefer | |
| 2004/0197612 A1 | 10/2004 | Keefer | |
| 2006/0188433 A1* | 8/2006 | Weimer et al. | 423/622 |
| 2008/0019903 A1* | 1/2008 | Wegner | 423/657 |

* cited by examiner

*Primary Examiner* — Matthew Merkling
(74) *Attorney, Agent, or Firm* — Dennis W. Beech

(57) ABSTRACT

The present invention involves methods and apparatus for supplying hydrogen to a fuel cell to produce electricity. Water may be supplied in the form of steam for input to a catalytic converter. The converter may have a substrate element disposed therein coated with an oxide that may be oxidizable with steam and reducible back to an original state without use of a chemical agent. The steam may be converted to hydrogen and oxygen with the hydrogen channeled to an input and the oxygen channeled to an output of the fuel cell. The hydrogen output of the fuel cell and the oxygen may be combined to produce steam. The steam from the output may be recycled to the converter.

3 Claims, 1 Drawing Sheet

METHOD AND SYSTEM FOR HYDROGEN POWERED FUEL CELLS

BACKGROUND OF THE INVENTION

This invention relates to fuel cells that convert hydrogen and oxygen to electricity and water. The new system and method may operate to convert steam to hydrogen and oxygen to supply a fuel cell to produce electricity and water or steam.

Various system and methods using reformation processes for hydrocarbons, other combustion gasses and steam to produce hydrogen may be known. These reformation processes may depend on a reforming catalyst to convert hydrocarbons in the presence of water vapor to produce hydrogen and other gas products, for example, carbon monoxide. The hydrogen and other products may be passed through a separation membrane to filter the hydrogen and impurities such as water vapor, carbon dioxide, methane, carbon monoxide and residual hydrocarbons. The hydrogen may be fed into the anode side of a fuel cell to be split into hydrogen ions and electrons. The electrons may be used to generate electricity and the hydrogen ions may be reacted with air to form a fuel cell exhaust stream.

SUMMARY OF THE INVENTION

The present invention is directed to methods and apparatus for supplying hydrogen to a fuel cell to produce electricity. Water may be supplied in the form of steam for input to a catalytic converter. The converter may have a substrate element disposed therein coated with an oxide that may be oxidizable with steam and reducible back to an original state without use of a chemical agent. The steam may be converted to hydrogen and oxygen with the hydrogen channeled to an input and the oxygen channeled to an output of the fuel cell. The hydrogen output of the fuel cell and the oxygen may be combined to produce steam. The steam from the output may be recycled to the converter.

These and other features, aspects and advantages of the present invention will become better understood with reference to the following drawings, description and claims.

DETAILED DESCRIPTION

Figure 1:
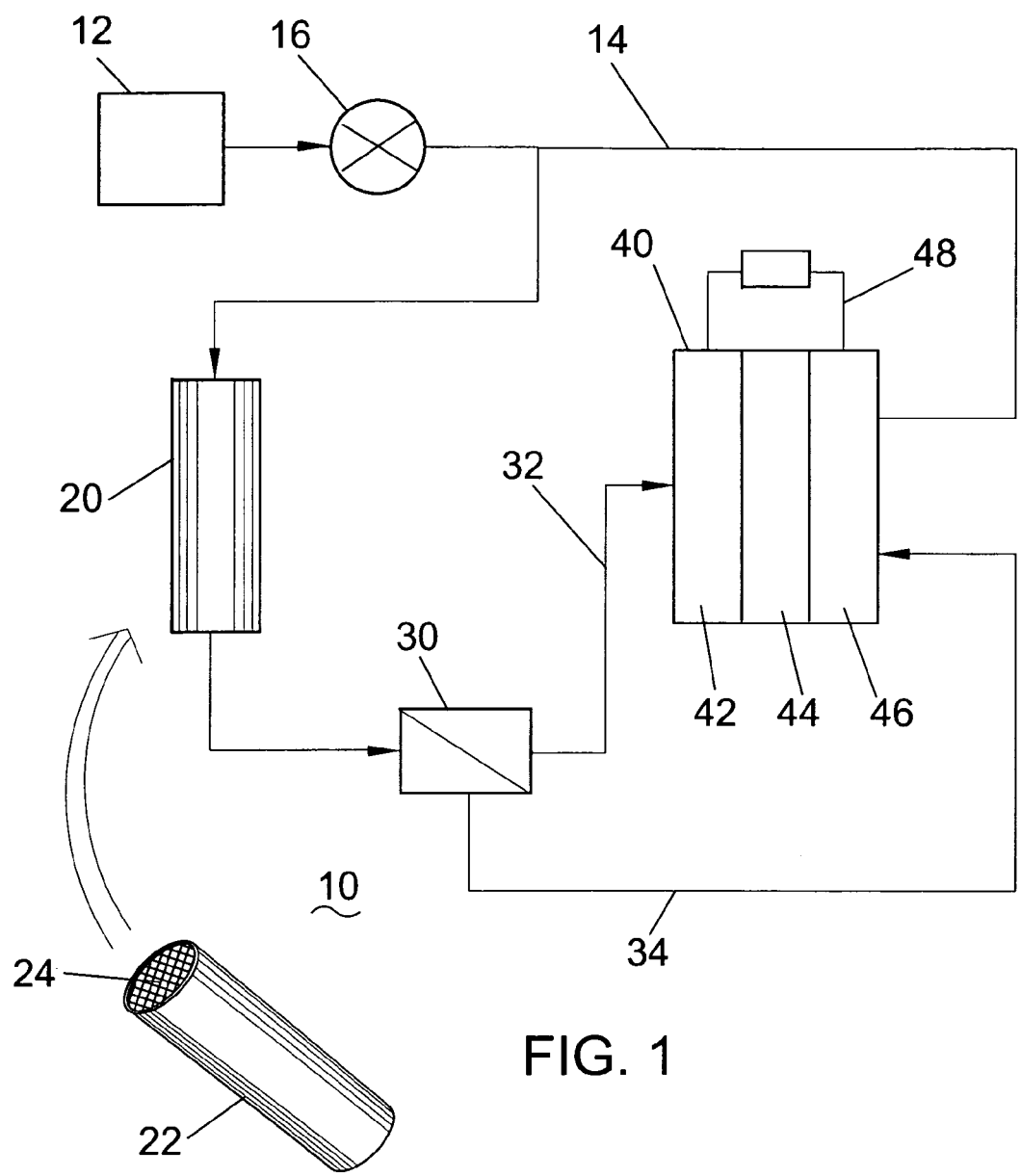
FIG. 1 illustrates a schematic representation of a supply system according to an embodiment of the invention.

The following detailed description represents the best currently contemplated modes for carrying out the invention. The description is not to be taken in a limiting sense, but is made merely for the purpose of illustrating the general principles of the invention.

Referring to FIG. 1, a hydrogen powered fuel cell system 10 may have a catalytic converter 20 in fluid communication with a separator 30. The separator 30 may channel hydrogen to a fuel cell 40 input and the oxygen to a fuel cell 40 output to react with the hydrogen output for conversion to water. The water may be recycled as steam to the catalytic converter 20. The system 20 may use water that produces principally hydrogen and oxygen to power a fuel cell and then combining the hydrogen output of the fuel cell with the oxygen to produce water to recycle as steam to the catalytic converter 20. There may be no significant pollutants exhausted as compared to existing hydrocarbon fuel based hydrogen producing systems.

The catalytic converter 20 may have a catalyst of an oxide compound that converts the water molecule of steam to hydrogen and oxygen. Various oxides of certain elements may oxidize with steam to produce hydrogen gas. The system and method of the invention may use oxides with steam and reduced back without a chemical reducing agent while producing oxygen gas. Examples of such oxide may be bismuth, selenium, tellurium, arsenic, manganese and antimony. By way of example, operation of the system 20 using bismuth trioxide $Bi_2O_3$ may be used.

The catalyst may be retained on a substrate element 22 that may be inserted in the catalytic converter 20 body that may be of hollow cylindrical form. The substrate element 22 may be of cylindrical form with a honeycomb like interior structure of cells 24 that have a multiple number of passages of a length for conversion and production of hydrogen and oxygen sufficient to power a fuel cell 40.

The substrate element 20 may be prepared by first dissolving bismuth material or compound in acid. A suitable substrate for absorption of the bismuth molecule may then be immersed in the acid and bismuth mixture to absorb the bismuth. The substrate element 22 may then be removed, dried and then heated to oxidize the bismuth to a trioxide form. Bismuth trioxide has been found to be a stable form of bismuth oxide.

For bismuth trioxide $Bi_2O_3$ when heat may be applied in the presence of air, a higher oxidation state may be reached, such as $Bi_2O_4$ or $Bi_2O_5$. These oxides tend to reduce back to $Bi_2O_3$ when cooled and release oxygen. Experiments with catalytic conversion have proven that water in the form of steam may oxidize $Bi_2O_3$ to produce hydrogen gas and when cooled, oxygen gas. If the steam and $Bi_2O_3$ may be heated to the proper temperature, for example, a temperature range from approximately 200 degrees Fahrenheit to 1,200 degrees Fahrenheit, both hydrogen and oxygen gases may be produced.

A fuel cell 40 may operate to produce electricity when hydrogen is passed over a membrane 42 to produce hydrogen ions and electrons. The hydrogen ions may be recombined with oxygen to be converted to water and the electrons may be used to produce electricity. Three types of fuel cells 40 may be used to produce electricity in the system 10. They may be combined for continuous or intermittent electrical output and to produce a desired amount of steam to be flowed through the $Bi_2O_3$ converter 20 to produce the necessary hydrogen and oxygen to produce electric power.

The polymer exchange membrane fuel cell may be very practical for producing varying amounts of electrical output and when the hydrogen and oxygen are converted to water in the process of generating electricity, heat may be produced in the range of 140 to 176 degrees Fahrenheit. This may not be enough heat to generate necessary steam. The solid oxide fuel cell may not be practical for varying amounts of electrical output and when the hydrogen and oxygen are combined heat may be produced in the range of 1,290 to 1,830 degrees Fahrenheit. The fuel cell may be excellent for generating steam for the system 10. Another fuel cell example may be molten-carbonate fuel cells that may operate at approximately 1,100 degrees Fahrenheit. This type of fuel cell is practical for continuous electrical power output. It may also be inexpensive to manufacture relative to other fuel cells.

In operation the system 10 may operate with minimal external energy input. A steam source 12 may be in fluid communication with conduit 14 through a valve 16. Steam in conduit 14 may be flowed through converter 20 to produce hydrogen and oxygen that may be separated in separator 30. The hydrogen may be channeled through conduit 32 to a fuel cell 40 at an input 42 or anode side to contact a membrane 44 to produce hydrogen ions and electrons. The hydrogen ions may flow to an output 46 or cathode and be combined with oxygen from the separator 30 to form water as steam that may be recycled to the converter 20. The electrons may be used to generate electric power in a circuit 48.

While the invention has been particularly shown and described with respect to the illustrated embodiments thereof, it will be understood by those skilled in the art that the foregoing and other changes in form and details may be made therein without departing from the spirit and scope of the invention.

I claim:

1. A method for supplying hydrogen to a fuel cell to produce electricity comprising:

supplying water in the form of steam for input to a catalytic converter that has a substrate element disposed therein with said substrate element coated with an oxide that is oxidizable with steam and reducible back to the original state without use of a chemical agent while producing oxygen;

converting said steam to hydrogen and oxygen, flowing said hydrogen to an input of a fuel cell, and flowing said oxygen to an output of said fuel cell;

combining the hydrogen output of said fuel cell and the oxygen to form water and heat to produce steam; and recycling steam from said output for input to said catalytic converter.

2. The method as in claim 1 wherein said oxide is selected from the group consisting of bismuth, selenium, tellurium, arsenic, manganese and antimony.

3. The method as in claim 1 wherein at least one of said fuel cells is selected that combines hydrogen and oxygen to produce water and heat in the temperature range of approximately 200 degrees Fahrenheit to 1,200 degrees Fahrenheit.

* * * * *